US008193906B2

(12) United States Patent
Katagiri et al.

(10) Patent No.: US 8,193,906 B2
(45) Date of Patent: Jun. 5, 2012

(54) MECHANICAL KEY CODE VERIFICATION SYSTEM

(75) Inventors: Toshiharu Katagiri, Aichi (JP); Yoshiyuki Seki, Aichi (JP); Tamotsu Tsuchida, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 824 days.

(21) Appl. No.: 12/336,359

(22) Filed: Dec. 16, 2008

(65) Prior Publication Data

US 2009/0153294 A1 Jun. 18, 2009

(30) Foreign Application Priority Data

Dec. 17, 2007 (JP) ................................ 2007-325052

(51) Int. Cl.
*G06K 19/00* (2006.01)

(52) U.S. Cl. ............................ 340/5.67; 70/336; 70/348

(58) Field of Classification Search ................. 340/5.67; 70/336, 348

See application file for complete search history.

(56) References Cited

U.S. PATENT DOCUMENTS

| | | | | |
|---|---|---|---|---|
| 4,452,059 | A | 6/1984 | Sornes | |
| 5,335,701 | A * | 8/1994 | Frazier | 140/57 |
| 2004/0051380 | A1* | 3/2004 | Okada | 307/10.5 |
| 2007/0001859 | A1* | 1/2007 | Kayanakis et al. | 340/572.7 |
| 2008/0204237 | A1* | 8/2008 | Levin | 340/572.1 |

FOREIGN PATENT DOCUMENTS

| | | |
|---|---|---|
| JP | 57-58784 | 4/1982 |
| JP | 08-022526 | 1/1996 |
| JP | 2001-043337 | 2/2001 |
| JP | 2001-319204 | 11/2001 |
| JP | 2001-357368 | 12/2001 |
| JP | 2002-279387 | 9/2002 |
| JP | 2005-206048 | 8/2005 |
| JP | 2005-330770 | 12/2005 |

* cited by examiner

*Primary Examiner* — Jennifer Mehmood
*Assistant Examiner* — Naomi Small
(74) *Attorney, Agent, or Firm* — Patterson Thuente Christensen Pedersen, P.A.

(57) ABSTRACT

A mechanical key code verification system including a mechanical key and a lock apparatus into which the mechanical key is inserted. The mechanical key includes a key body. A key code pattern formed on the key body includes a plurality of recessed portions and a plurality of non-recessed portions. A wireless communication mechanism is incorporated in the key body which performs wireless communication with a communication device. The wireless communication device including an antenna arranged on the key body. The lock apparatus mechanically verifies the key code pattern of the mechanical key when the mechanical key is inserted therein. The recessed portions of the key code pattern of the mechanical key is located inward from the antenna on the key body.

13 Claims, 12 Drawing Sheets

MECHANICAL KEY CODE VERIFICATION SYSTEM

CROSS-REFERENCE TO RELATED APPLICATIONS

This application is based upon and claims the benefit of priority from prior Japanese Patent Application No. 2007-325052, filed on Dec. 17, 2007, the entire contents of which are incorporated herein by reference.

BACKGROUND OF THE INVENTION

The present invention relates to a mechanical key code verification system that verifies a key code pattern formed by a plurality of recessed portions and a plurality of non-recessed portions of a mechanical key.

In the prior art, to prevent information leaks, corporations and institutes install security systems in their buildings. Such a security system prevents an unauthorized person from trespassing into the building. One type of a known security system permits the entrance of a person into a building when that individual satisfies verification conditions. In this type of security system, personnel, who are allowed to enter a facility, are each provided with a card key (verification key) including an IC tag. This type of IC tag contains an ID code. Radio waves from a communication device activate the IC tag so as to generate a transmission of the ID code. Thus, the card key does not require a power source such as a battery. This advantage has resulted in wide use of card keys using IC tags.

Japanese Laid-Open Patent Publication No. 2005-330770 describes an example of a card key, which includes an IC tag. A mechanical key code is formed on the card key. Thus, with the same card key, verification of a mechanical key in addition to verification of an electronic card key is enabled. The card key of the publication is applied to rental bicycles. More specifically, a person who wishes to rent a bicycle holds the IC tag of the card key near a card reader or the like to perform electronic payment and identify him or herself. The person is allowed to rent a bicycle after completing the electronic payment and individual identification. When parking the rented bicycle, the person inserts the card key into a slot provided in the bicycle. As a result, the key is verified based on the mechanical key code to lock the bicycle. To unlock the bicycle, the card key is removed from the slot.

In the card key of Japanese Laid-Open Patent Publication No. 2005-330770, a plurality of holes formed in the IC card, which has a flat plate-shape, are used to define the mechanical key code. More specifically, the holes are formed in a peripheral portion of the IC card between the rim of the IC card and an antenna arranged in the IC card. However, when a hole is located near the rim, the hole may cause the rim to easily break in the vicinity of the hole.

The present invention provides a mechanical key code verification system that improves mechanical strength of a key code pattern.

One aspect of the present invention is a mechanical key code verification system including a mechanical key and a lock apparatus into which the mechanical key is insertable. The mechanical key includes a key body having at least one plane. A key code pattern is formed on the at least one plane of the key body and including a plurality of recessed portions and a plurality of non-recessed portions. A wireless communication mechanism is incorporated in the key body which performs wireless communication with a communication device. The wireless communication device includes an antenna arranged on the key body. The lock apparatus mechanically verifies the key code pattern of the mechanical key when the mechanical key is inserted therein. The recessed portions of the key code pattern of the mechanical key is located inward from the antenna on the key body.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3(*b*) is a cross-sectional view of the IC card key

FIGS. 5(*b*) and 5(*c*) are partial enlarged views showing the lock apparatus together with an inauthentic card key;

FIG. 11(*b*) is a cross-sectional side view of the IC card key shown in FIG. 11(*a*);

DETAILED DESCRIPTION OF THE PREFERRED EMBODIMENTS

A first embodiment of a mechanical key code verification system according to the present invention will now be discussed with reference to FIGS. 1 to 10.

Figure 1:
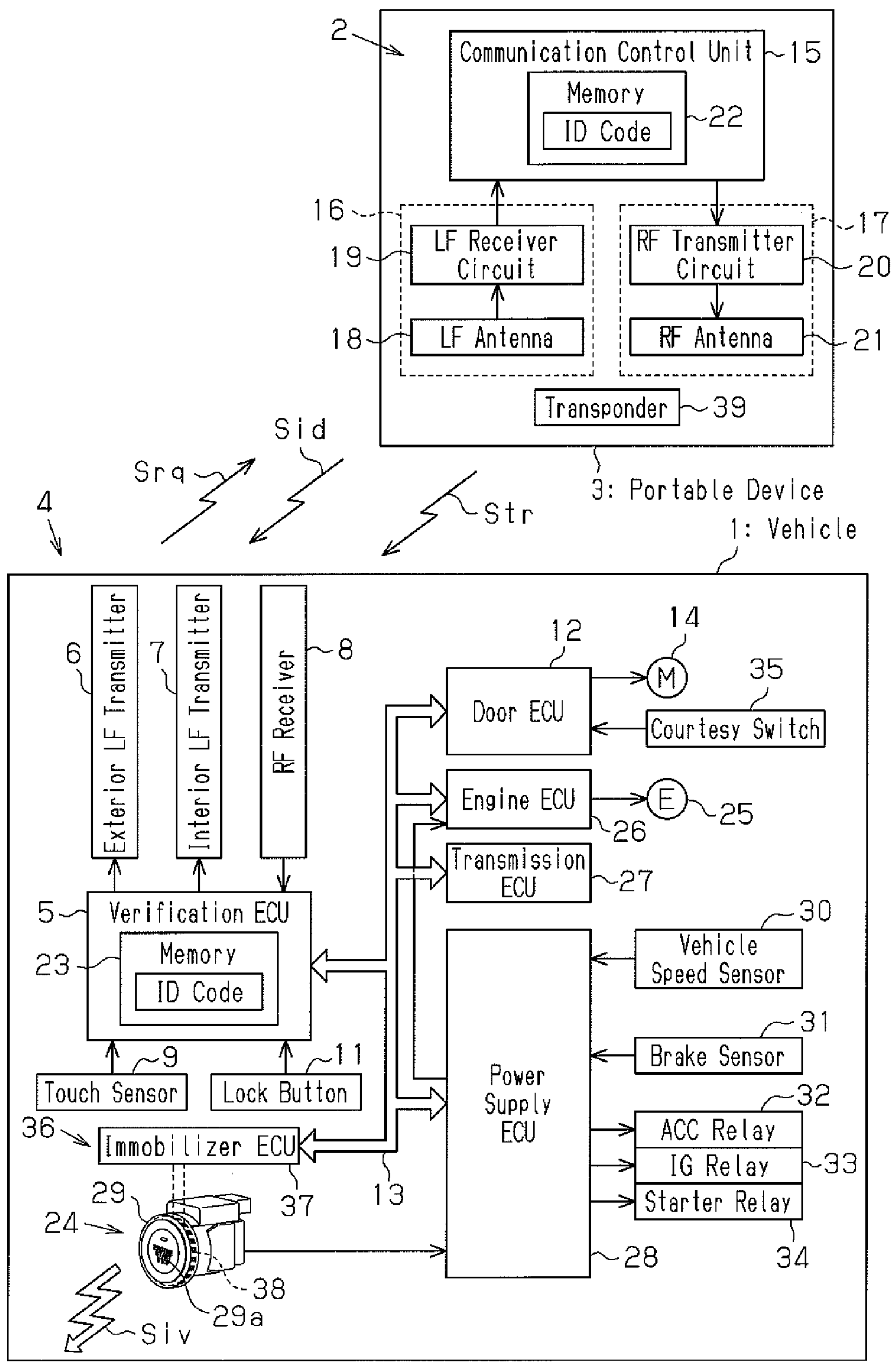
FIG. 1 is a block diagram of a key operation-free system.

As illustrated in FIG. 1, a vehicle 1 incorporates a key operation-free system 2 that performs vehicle operations including the locking and unlocking of the doors and the starting and stopping of the engine without physically operating a vehicle key. The key operation-free system 2 uses a vehicle key, which is a portable device 3 that transmits a unique ID code (key code) through wireless communication. In the key operation-free system 2, the vehicle 1 transmits a request signal Srq requesting the ID code. The portable device 3 returns an ID signal Sid including the ID code to the vehicle 1 through narrow-band wireless communication in response to the request signal Srq. If the ID code of the portable device 3 matches an ID code of the vehicle 1, the key operation-free system 2 enables the locking and unlocking of the door and the starting and stopping of the engine. The key operation-free system 2 is one example of an electronic key system, and the portable device 3 is one example of an electronic key.

The key operation-free system 2 incorporates a smart entry system 4 that locks and unlocks the doors without any physical operation of the vehicle key. The smart entry system 4 will now be described. The vehicle 1 includes a verification ECU 5 for verifying the ID code of the portable device 3 in the ID signal Sid received through narrow-band wireless communication. The verification ECU 5 is connected to a vehicle exterior LF transmitter 6, a vehicle interior LF transmitter 7, and an RF receiver 8. The vehicle exterior LF transmitter 6 is arranged in each door of the vehicle 1 to transmit a long frequency (LF band) signal out of the vehicle through wireless communication. The vehicle interior LF transmitter 7 is arranged in the vehicle (e.g., in the floor etc.) to transmit a LF band signal within the vehicle through wireless communication. The RF receiver 8 is arranged in the vehicle (e.g., in the rearview mirror etc.) to receive an RF band signal through wireless communication. The LF transmitters 6 and 7 transmit the request signal Srq through wireless communication. Specifically, the vehicle exterior LF transmitter 6 forms a communication area (vehicle exterior communication area) for the request signal Srq around the vehicle. The vehicle interior LF transmitter 7 forms a communication area (vehicle interior communication area) for the request signal Srq throughout the entire vehicle interior.

The verification ECU 5 is connected to a touch sensor 9 arranged, for example, in a door handle at the outer side of the vehicle. The touch sensor 9 detects a person touching the door handle 10 when the door is locked to unlock the door. The verification ECU 5 is connected to a lock button 11 arranged in, for example, the door handle 10. The lock button 11 is pushed to lock the unlocked door. The verification ECU 5 is connected to a door ECU 12, which controls the locking and unlocking of the door though an in-vehicle LAN 13. The door ECU 12 locks or unlocks the door by driving a door lock motor 14 in accordance with a command from the verification ECU 5.

The portable device 3 includes a communication control unit 15 for controlling wireless communication that is performed with the vehicle 1. The communication control unit 15 is connected to an LF reception unit 16, which receives an LF band signal, and an RF transmission unit 17, which transmits an RF band signal in accordance with a command from the communication control unit 15. The LF reception unit 16 demodulates an LF band signal, which is received by an LF reception antenna 18, in an LF receiver circuit 19 and provides the demodulated signal to the communication control unit 15 as received data. The RF transmission unit 17 modulates transmission data provided from the communication control unit 15 with an RF transmitter circuit 20, generates the ID signal Sid in the RF band with the unique ID code of the portable device 3, and transmits the ID signal Sid from an RF transmission antenna 21.

When the vehicle 1 is in a parked state (engine stopped and doors locked), the verification ECU 5 intermittently transmits the request signal Srq in the LF band to the vehicle exterior LF transmitter 6 and forms the vehicle exterior communication area around the vehicle. When the portable device 3 enters the vehicle exterior communication area and receives the request signal Srq with the LF reception unit 16, the portable device 3 transmits the ID signal Sid containing the ID code registered in a memory 22 to the RF transmission unit 17 as the RF band wireless signal in response to the request signal Srq. In the verification ECU 5, the ID code of the portable device 3 contained in the ID signal Sid and received by the RF receiver 8 is verified with the ID code registered in a memory 23 (vehicle exterior verification). When the vehicle exterior verification is completed, the verification ECU 5 sets a vehicle exterior verification flag in the memory 23 over a fixed time period and activates the touch sensor 9 in a standby state during that time period. When the activated touch sensor 9 detects that the vehicle exterior door handle has been touched, the door ECU 12 unlocks the locked door by generating rotation with the door lock motor 14 in one direction.

In a state in which the vehicle 1 is not moving (engine stopped and door unlocked), the verification ECU 5 transmits the request signal Srq to the vehicle exterior LF transmitter 6 when detecting that the lock button 11 has been pushed. The verification ECU 5 performs the vehicle exterior verification on the ID signal Sid returned from the portable device 3 in response to the request signal Srq. The verification ECU 5 provides a door lock request to the door ECU 12 when the vehicle exterior verification is completed. The door ECU 12 locks the unlocked door by generating rotation with the door lock motor 14 in the other direction in response to the door lock request.

The key operation-free system 2 includes a one-push engine start system 24 enabling the starting and stopping of the engine by just operating a vehicle switch. Physical operation of the vehicle key is not necessary. The one-push engine start system 24 will now be described. The vehicle 1 includes an engine ECU 26 that executes ignition control and fuel injection control for an engine 25, a gearshift ECU 27 that controls automatic transmission according to the operation of a gearshift lever, and a power supply ECU 28 that executes power supply management for in-vehicle electronic components. The ECUs 26 to 28 are connected to various ECUs including the verification ECU 5 through the in-vehicle LAN 13.

An engine switch 29, which is operated when switching the power supply state of the vehicle 1, is arranged near the driver's seat in the vehicle 1. The engine switch 29 is of a push-operation type and includes a switch portion 29*a* that is pushed. The engine switch 29 is connected to the power supply ECU 28 by a harness. The engine switch 29 has an engine starting and stopping operation function, which switches the engine 25 to a started state or a stopped state, and a power supply transition operation function, which switches the power supply state of the vehicle 1 to an OFF state, an ACC ON state, or an IC ON state.

The power supply ECU 28 is connected to a vehicle speed sensor 30, which detects the travel speed of the vehicle 1, and a brake sensor 31, which detects the depression amount of the brake pedal. The power supply ECU 28 recognizes the current traveling speed of the vehicle 1, which is based on the vehicle speed information from the vehicle speed sensor 30, and determines depression of the brake pedal, which is based on the pedal depression amount information from the brake sensor 31. The power supply ECU 28 is connected to an ACC relay 32, which is connected to various in-vehicle accessories, an IC relay 33, which is connected to the engine ECU 26, and a starter relay 34, which is connected to a starter motor of the engine 25.

After the vehicle exterior verification is completed and the door is unlocked, the verification ECU 5 recognizes via a courtesy switch 35 that the driver is entering the vehicle as the door opens. The verification ECU 5 forms the vehicle interior communication area in the entire vehicle interior by transmitting the request signal Srq to the vehicle interior LF transmitter 7. When receiving the ID signal Sid in response from the portable device 3, which is located in the vehicle interior communication area, with the RF receiver 8 (vehicle interior verification), the verification ECU 5 verifies the ID code of the portable device 3 contained in the ID signal Sid with the ID code registered in the verification ECU 5. The verification ECU 5 sets a vehicle interior verification completion flag in the memory 23 when the vehicle interior verification is completed.

When the driver pushes the engine switch 29 to switch the power supply state of the vehicle 1, the power supply ECU 28 first checks the verification ECU 5 and determines whether the vehicle interior verification has been completed. The power supply ECU 28 recognizes that the vehicle interior verification has been completed when notified by the verification ECU 5 that the vehicle interior verification has been completed. When notified by the verification ECU 5 that the vehicle interior verification ha not been satisfied, the power supply ECU 28 instructs the verification ECU 5 to re-execute the vehicle interior verification and re-check whether the vehicle interior verification has been completed. The power supply ECU 28 continues to determine that the vehicle interior verification has not been completed even after the verification ECU 5 re-executes the vehicle interior verification unless notified by the verification ECU 5 that the vehicle interior verification has been completed.

When the engine switch 29 is pushed in a state in which the brake pedal is depressed and the engine 25 is stopped, the power supply ECU 28 activates the three relays 32 to 34 to start the engine 25 as long as the vehicle interior verification is satisfied and then outputs an activation signal to the engine ECU 26. When receiving the activation signal, the engine ECU 26 checks the result of the vehicle interior verification and then checks whether the verification ECU 5 can be mated as a pair with the engine ECU 26 by performing pairing through encryption communication. If the two conditions are satisfied, the engine ECU 26 initiates the ignition control and the fuel injection control to start the engine 25. In a state in which the vehicle 1 stops moving (vehicle speed "0") and the engine switch 29 is pushed while the engine 25 is still running, the power supply ECU 28 deactivates all of the three relays 32 to 34 to stop the engine 25.

If the engine switch 29 is pushed but the brake pedal is not depressed when the engine 25 is stopped, as long as the vehicle interior verification conditions are satisfied and the gearshift lever is located at the P range position, the power supply ECU 28 sequentially shifts the power supply state whenever the engine switch 29 is pushed in the order of OFF state, ACC ON state, and IG ON state. For example, the power supply state of the vehicle 1 is switched from the OFF state to the ACC state if the engine switch 29 is pushed once when the engine 25 is not running. From this state, the power supply state of the vehicle 1 is switched to the IG ON state when the engine switch 29 is pushed once more. From this state, the power supply state of the vehicle 1 returns to the OFF state when the engine switch 29 is pushed once more.

The vehicle 1 includes an immobilizer system 36 for performing wireless ID verification using a communication tag incorporated in the portable device 3. The immobilizer system 36 includes an immobilizer ECU 37. The immobilizer ECU 37 includes a CPU and a memory and is connected to the in-vehicle LAN 13. The immobilizer ECU 37 is connected to a transponder key coil 38, which functions as a vehicle antenna for the immobilizer system 36. The transponder key coil 38 is wound around a switch portion 29*a* in the housing of the engine switch 29. The portable device 3 incorporates a transponder, which serves as a communication tag, for transmitting a unique ID code number.

The immobilizer system 36 transmits a drive radio wave Siv from the transponder key coil 38 by arranging the portable device 3 near the transponder key coil 38. The drive radio wave Siv activates a transponder 39 in the portable device 3 so that the portable device 3 returns a transponder code signal Str in response. The immobilizer ECU 37 performs ID verification (immobilizer verification) on a code number included in the transponder code signal Str. To start the engine 25 by pushing the engine switch 29, completion of the vehicle interior verification is checked as an authentication operation performed before engine starting. When conducting this check, there may be a condition in which the key operation-free system 2 is used and the ID verification is completed (vehicle interior verification is completed) or in which the ID verification is completed when using either the key operation-free system 2 or the immobilizer system 36.

Figure 2:
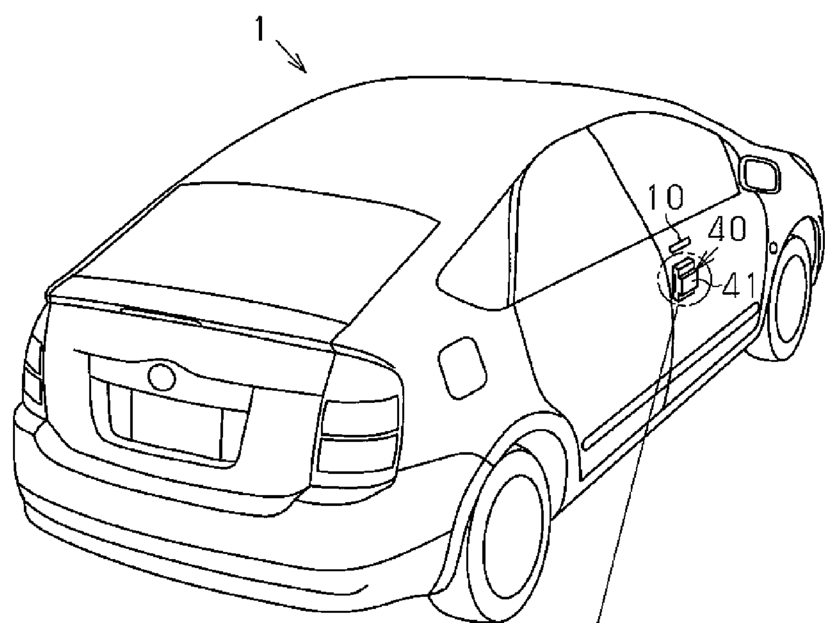
FIG. 2 is a perspective view showing a lock apparatus and a card key for a mechanical operation type door lock system.
Figure 2:
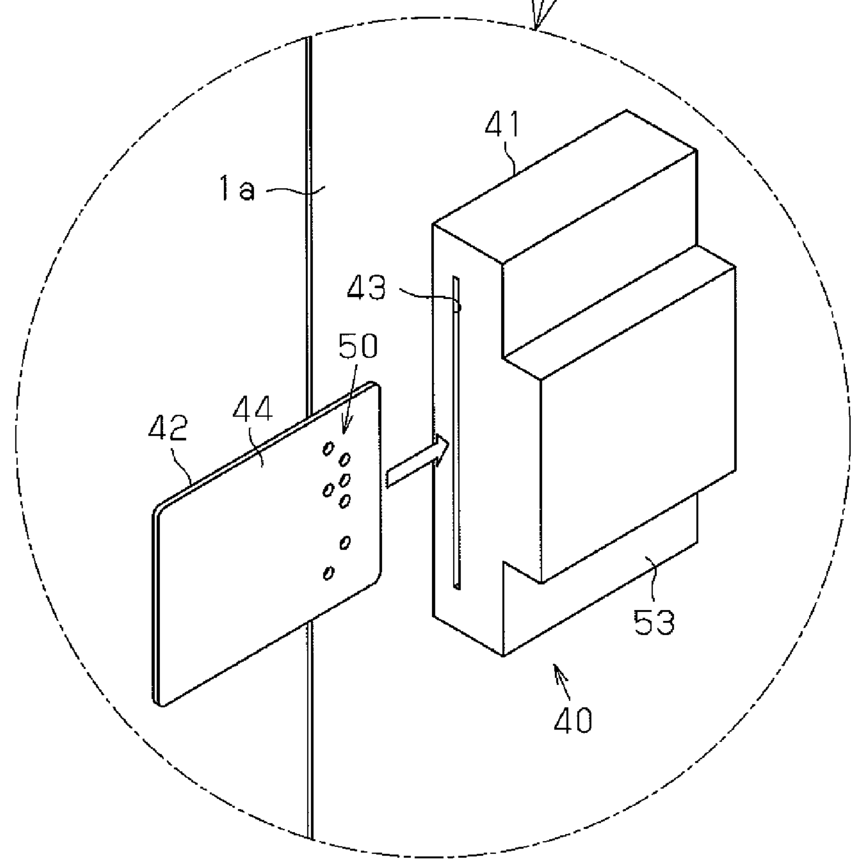

A mechanical operation type door lock system 40 illustrated in FIG. 2 will now be discussed. The mechanical operation type door lock system 40 is advantageous when a physical key operation with a mechanical key becomes necessary to lock or unlock the doors. Since the smart entry system 4 (key operation-free system 2) is of an electrical type, a door cannot be locked or unlocked by the smart entry system 4 if the smart entry system 4 fails to function or if battery drainage occurs in the portable device 3. The mechanical operation type door lock system 40 is used to enable the locking and unlocking of the doors under such situations.

The mechanical operation type door lock system 40 includes a lock apparatus 41, which is attached to an outer wall of the vehicle door (driver's seat door) 1*a*, and a mechanical key 42. The mechanical key 42 is inserted into the lock apparatus 41 and physically operated to open (unlock state) or close (lock state) the lock apparatus 41. In the preferred embodiment, the mechanical key 42 is of a card type (flat plate-shape) and is thus also referred to as a card key 42. The mechanical operation type door lock system 40 may be referred to as a card key type door lock system. In a state in which the authentic card key 42 is inserted into a key hole 43 of the lock apparatus 41, the door is locked by moving the card key 42 from the initial position in a first direction (e.g., upward direction). Further, the door is unlocked by moving the card key 42 from the initial position in a second direction (e.g., downward direction).

The mechanical operation type door lock system 40 is used during an emergency such as when the smart entry system 4 fails to function or when battery drainage occurs in the portable device 3. The card key 42 can be used as an emergency key during such an emergency. The card key 42 can be flat and may have a size similar to that of a typical credit card. Thus, the card key 42 can be carried in a wallet in the same manner as credit cards. The card key 42 corresponds to a mechanical key.

The card key 42 is a non-contact communication type key, which performs wireless communication with various types of communication devices located within a short distance (e.g., several centimeters to several meters) so as to transmit and receive various types of information. The card key 42 is hereinafter referred to as an IC card key 42. A communication tag is embedded in the IC card key 42. This enables the IC card key 42 to perform near-field wireless communication that is in compliance with radio frequency identification (RFID) communication. Examples of such near-field wireless communication include FELICA® and OSAIFU-KEITAI®. The tag of the IC card key 42 may be of a passive type or an active type, and electromagnetic waves are transmitted through an electromagnetic induction scheme or a radio wave scheme. The operational frequency for near-field wireless communication used by the IC card key 42 is not particularly limited and may be, for example, 135 KHz, 13.56 MHz, 433 MHz, 860 to 960 MHz, or 2.45 GHz.

The structure of the card key 42 will now be discussed with reference to FIG. 3. The card key 42 includes a case, or a key body 44, which incorporates a wireless communication mechanism 45 for performing wireless communication that is in compliance with RFID communication. The wireless communication mechanism 45 includes an IC tag 46, which controls the wireless communication mechanism 45, and an antenna 47 for the wireless communication mechanism 45. The IC tag 46 is formed by a very small IC chip and is connected to the antenna 47 by a wire. When the IC tag 46 is a passive tag, the antenna 47 is used as a data transmitting and receiving antenna. When the antenna 47 receives external drive radio waves, the passive type IC tag 46 is activated. After activation, the IC tag 46 exchanges various types of data with an external wireless communication device via the antenna 47 and reads data from or writes data to an internal memory. The antenna 47 serves as one of electronic components of the wireless communication mechanism.

The antenna 47 may be a loop-type antenna formed by a ring-like metal plate. The antenna 47 is embedded in the key body 44. The antenna 47 is generally rectangular and extends long the four sides of the rectangular key body 44. Thus, open area is provided between the four sides of the antenna 47. The antenna 47 is connected to a resonation capacitor 48, which is for resonating the antenna 47, and an adjustment capacitor 49, which is for adjusting the signal frequency of the antenna 47. The capacitors 48 and 49 are directly connected to the key body 44 and arranged inward from the antenna 47. The IC tag 46 is arranged inward from the antenna 47.

Figure 3A:
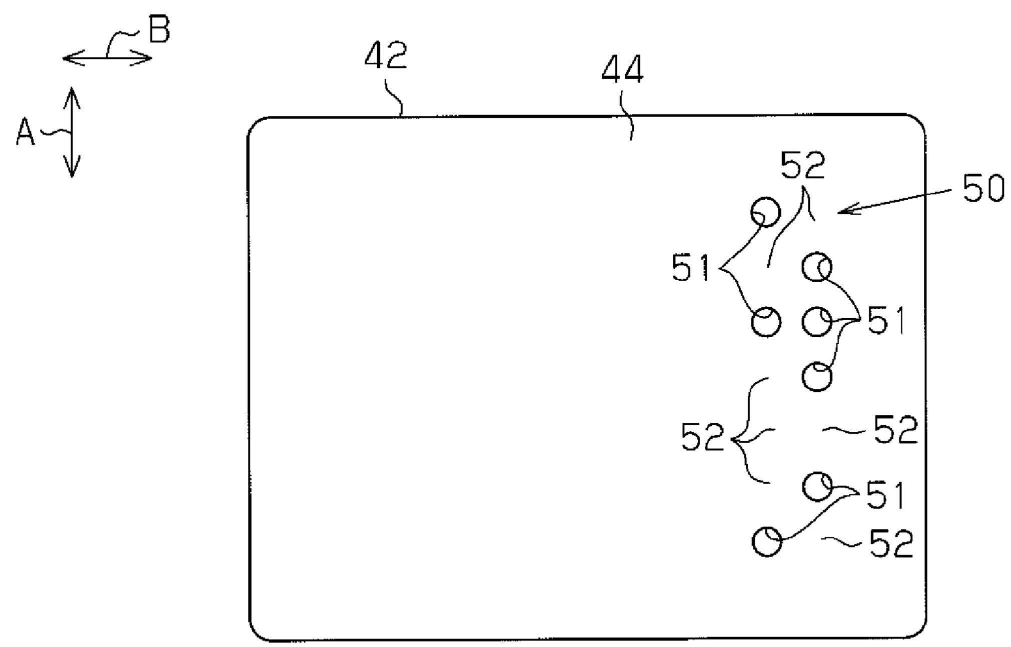
FIG. 3(*a*) is a plan view showing an IC card key.
Figure 3B:
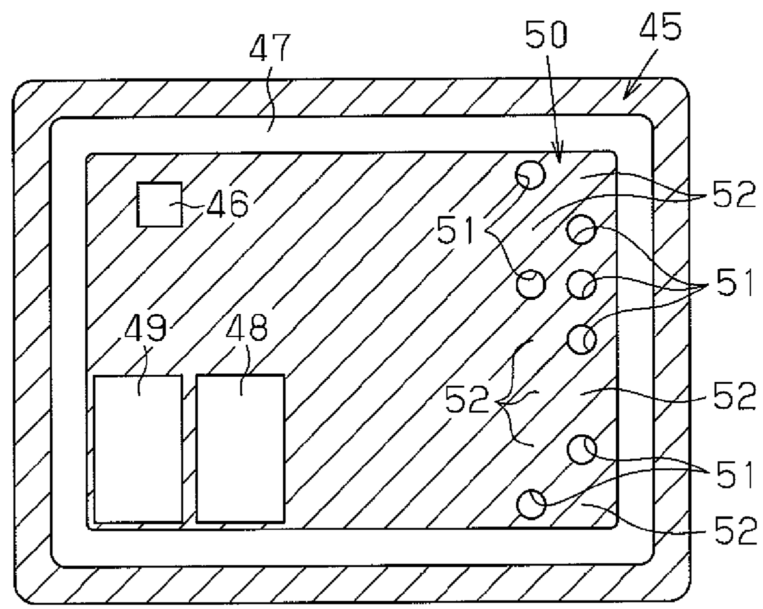

As shown in FIG. 3, the key body 44 of the card key 42 includes a key code pattern 50, which is formed inward from the antenna 47. The key code pattern 50 defines a mechanical key code of the mechanical operation type door lock system 40. The region of the card key 42 inward from the antenna 47 includes an unused area (vacant area), which is not used by the wireless communication mechanism 45. The mechanical key code, or key code pattern 50, of the card key 42 is formed in the unused area.

The key code pattern 50 includes a plurality of hole portions 51 and a plurality of non-hole portions 52 formed along the lateral direction (direction of arrow A in FIG. 3) or longitudinal direction (direction of arrow B in FIG. 3) of the key body 44. The hole portions 51 may be formed so as to be arranged with a regularity. For example, the hole portions 51 may be arranged continuously or in certain intervals. The key code pattern 50 is arranged at the distal side of the key body 44 (refer to FIG. 2). The hole portions 51 may all have the same shape (e.g., circular). The hole portions 51 each serve as a recessed portion, and the non-hole portions 52 each serve as a non-recessed portion.

As illustrated in FIGS. 4 to 7, the lock apparatus 41 includes a slider case 53. The slider case 53 is the body portion of the lock apparatus 41 and is box-shaped. The key hole 43 (see FIG. 2) is formed in a side wall of the slider case 53. The slider case 53 is attached to the outer wall of the vehicle door 1*a*. A slider 54 is accommodated in an accommodating space 53*a* of the slider case 53 so as to be movable (linearly movable) relative to the slider case 53. The slider 54 is formed by a plate and is movable in a longitudinal direction of the slider case 53 in the accommodating space 53*a*. The slider case 53 is one example of a support member, and the slider 54 is one example of a movable member. The slider case 53 may be referred to as a fixed side of the lock apparatus 41, and the slider 54 may be referred to as a movable side of the lock apparatus 41.

Pin tumblers 55 are arranged between the slider case 53 and the slider 54 to fix the slider 54 to the slider case 53 and disable locking and unlocking operations when the authentic card key 42 is not used. The plurality of pin tumblers 55 each face one of the hole portions 51 or the non-hole portions 52 when the card key 42 is inserted into the lock apparatus 41. Thus, the quantity of the pin tumblers 55 is the same as the total number of the hole portions 51 and non-hole portions 52 of the card key 42. For example, if the card key 42 has a total of fourteen hole portions 51 and non-hole portions 52, there would be fourteen pin tumblers 55.

Figure 4:
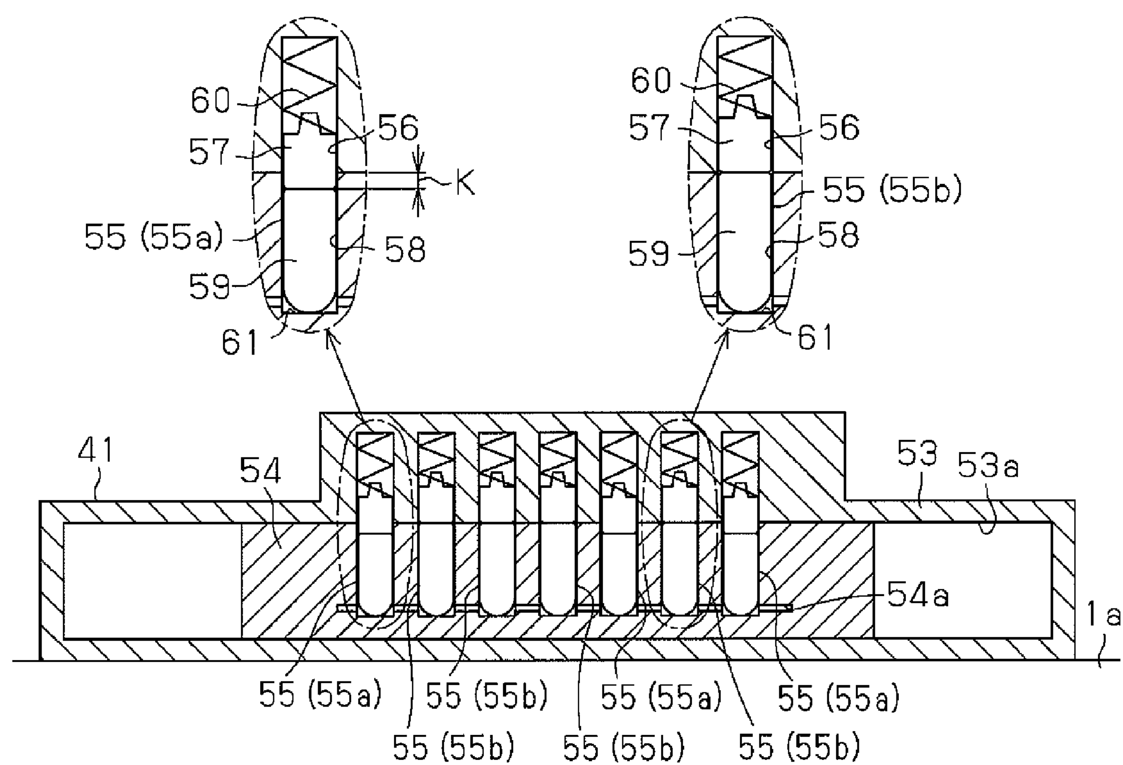
FIG. 4 is a cross-sectional view of the lock apparatus shown without the IC card key.

As illustrated in FIG. 4, each pin tumbler 55 includes a plunger pin 57, which is movably accommodated in a case side accommodation hole 56 formed in the slider case 53, and a lock pin 59, which is movably accommodated in a slider side accommodation hole 58 formed in the slider 54. The pin tumbler 55 is constantly biased toward the slider 54 by a tumbler spring 60 accommodated in the case side accommodation hole 56. The lock pin 59 is longer than the plunger pin 57. The lock pin 59 has a round cross-sectional shape that is in correspondence with the hole portions 51, which have a round cross-sectional shape. The lock pin 59 serves as a first locking pin, the plunger pin 57 serves as a second locking pin, and the tumbler spring 60 serves as a biasing member.

Figure 5B:
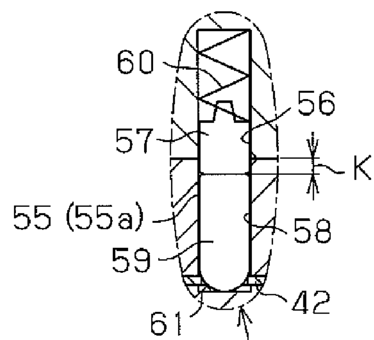
FIG. 5(*a*) is a cross-sectional view of the lock apparatus shown together with an authentic key.
Figure 5C:
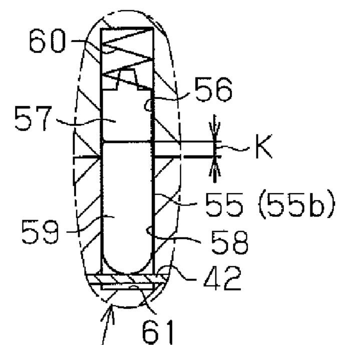
Figure 5A:
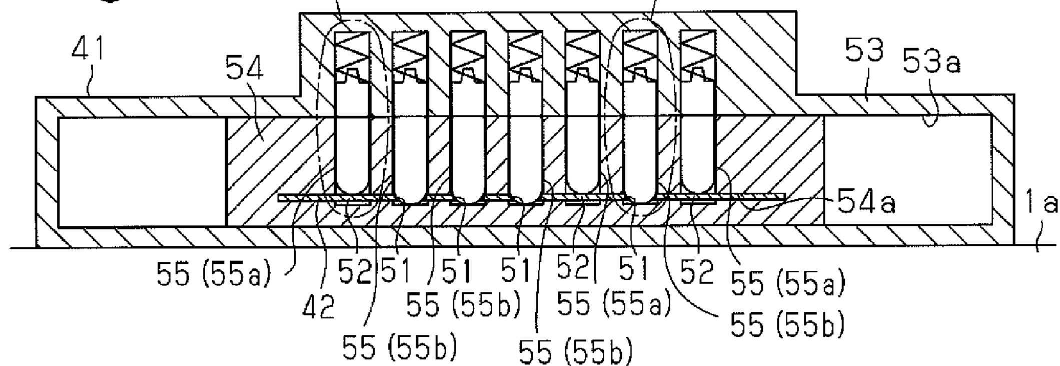

The pin tumbler 55 includes one or more first pin tumblers 55*a* and one or more second pin tumblers 55*b*. The lock pin 59 of each first pin tumbler 55*a* is shorter than the lock pin 59 of each second pin tumbler 55*b*. The first pin tumblers 55*a* are located at positions corresponding to the non-hole portions 52 of the authentic card key 42 when the authentic card key 42 is inserted into the lock apparatus 41, as shown in FIG. 5(*a*). When the card key 42 is not inserted to the lock apparatus 41 as illustrated in the state of FIG. 4 or when the first pin tumblers 55*a* are forced into the hole portions 51 of an inauthentic card key 42 as illustrated in the state of FIG. 5(*b*), the plunger pin 57 of each first pin tumbler 55*a* engages both the slider case 53 and the slider 54 over a constant engagement length K and restricts movement of the slider 54. Such a state is referred to as a pin tumbler locking state. When the authentic card key 42 is inserted into the lock apparatus 41 as illustrated in the state of FIG. 5(*a*), the first pin tumblers 55*a* are moved upward by an amount corresponding to the engagement length K against the biasing force of the corresponding tumbler springs 60 by the non-hole portions 52 of the card key 42. As a result, the shear line between the plunger pin 57 and the lock pin 59 of each first pin tumbler 55*a* (shear line between the two components of the plunger pin 57) becomes aligned with the shear line between the slider case 53 and the slider 54 (slide surface of the slider 54). Such a state is referred to as a pin tumbler unlocking state. The first pin tumblers 55*a* when in the pin tumbler unlocking state do not function to restrict movement of the slider 54.

The second pin tumblers 55*b* are located at positions corresponding to the hole portions 51 of the authentic card key 42 when the authentic card key 42 is inserted into the lock apparatus 41, as shown in FIG. 5(*a*). When the card key 42 is not inserted into the lock apparatus 41 as illustrated in the state of FIG. 4 or when the second pin tumblers 55*b* are forced into the hole portions 51 of the authentic card key 42 as illustrated in the state of FIG. 5(*a*), the shear line between the plunger pin 57 and the lock pin 59 of each second pin tumbler 55*b* is aligned with the shear line between the slider case 53 and the slider 54. This state is referred to as the pin tumbler unlocking state. The second pin tumblers 55*b* in the pin tumbler unlocking state do not function to restrict movement of the slider 54. When an inauthentic key is inserted into the lock apparatus 41 as illustrated in the state of FIG. 5(*c*), the second pin tumblers 55*b* are forced upward against the biasing force of the corresponding tumbler springs 60 by the non-hole portions 52. The second pin tumblers 55*b* engage both the slider case 53 and the slider 54 and restrict movement of the slider 54. This state is referred to as the pin tumbler locking state. The lift amount of each second pin tumbler 55*b* is the engagement length K of the lock pin 59 in each second pin tumbler 55*b*.

In the illustrated example, the total quantity of the first pin tumblers 55*a* and second pin tumblers 55*b* is the same as the total quantity of the hole portions 51 and non-hole portions 52 of the authentic card key 42. The quantity of the first pin tumblers 55*a* is the same as the quantity of the non-hole portions 52. The quantity of the second pin tumblers 55*b* is the same as the quantity of the hole portions 51. More specifically, a total of seven first pin tumblers 55*a* are located at positions facing toward the non-hole portions 52 when the authentic card key 42 is inserted into the lock apparatus 41. Further, a total of seven second pin tumblers 55*b* are located at positions facing toward the hole portions 51 when the authentic card key 42 is inserted into the lock apparatus 41.

Figure 6:
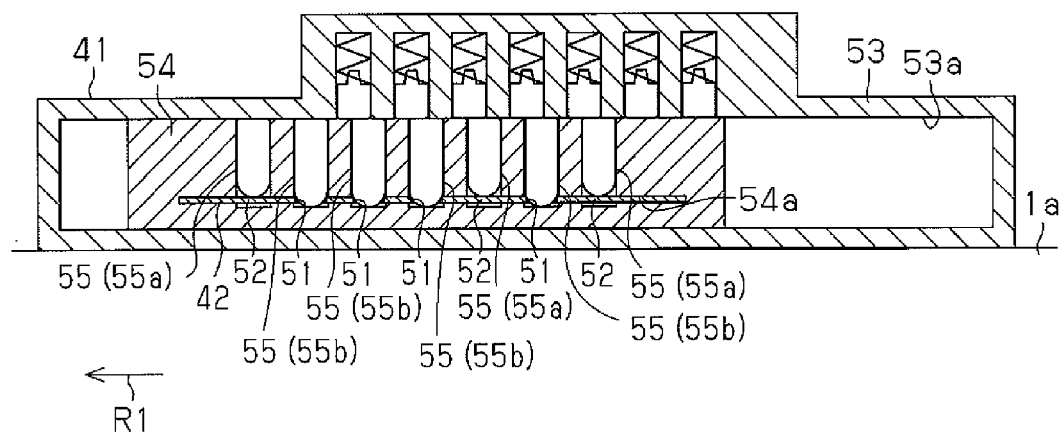
FIG. 6 is a cross-sectional view of the lock apparatus shown in a state opened by the card key.
Figure 7:
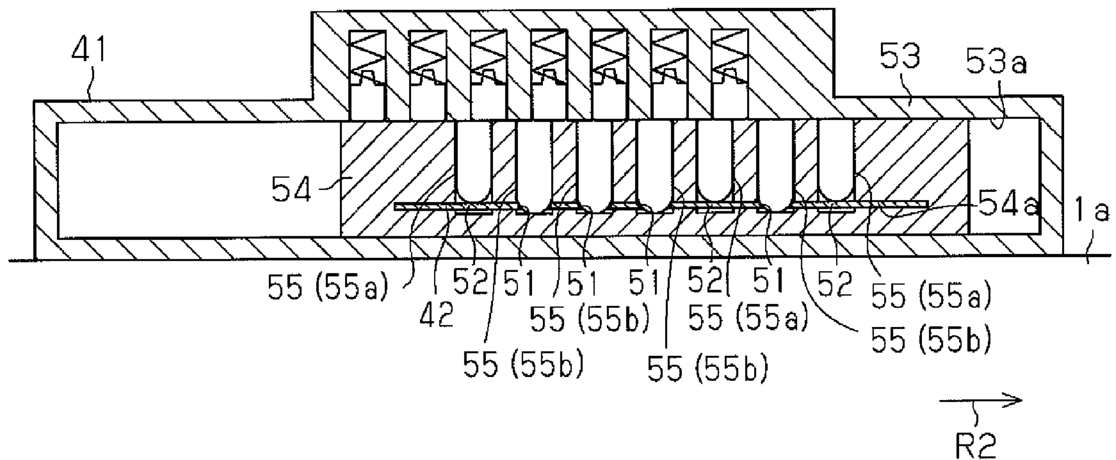
FIG. 7 is a cross-sectional view of the lock apparatus shown in a state closed by the card key.

The slider 54 is connected to a dead bolt (not illustrated), which is the door lock member, of the vehicle door 1*a* by a transmission mechanism (not illustrated). The transmission mechanism transmits and converts the movement of the slider 54 to the mechanical opening and closing of the dead bolt. Referring to FIGS. 6 and 7, when the card key 42 is inserted to the lock apparatus 41, the slider 54 becomes movable in two directions from a neutral position. When the slider 54 is moved in one direction (direction of arrow R1 in FIG. 6) from the neutral position, the transmission mechanism converts the movement of the slider 54 to a projection movement of the dead bolt to lock the vehicle door 1*a*. When the slider 54 is moved in the other direction (direction of arrow R2 in FIG. 7) from the neutral position, the transmission mechanism converts the slider movement to a retraction movement of the dead bolt to unlock the vehicle door 1*a*.

As illustrated in FIGS. 4 to 7, the slider 54 has a key slot 54*a*, which is in communication with the key hole 43. One surface defining the key slot 54*a* comes into contact with the distal ends of the pin tumblers 55. This surface includes pin accommodation recesses 61. The distal ends of the pin tumblers 55 (lock pins 59) are accommodated in the corresponding pin accommodation recesses 61. Each pin accommodation recess 61 functions to increase the lift amount of the corresponding pin tumbler 55 and increases the engagement length K of the pin tumbler 55. Further, each pin accommodation recess 61 has a depth from the key slot 54*a* that is determined to maximize the engagement length K within a range in which the edge of the card key 42 can enter the gap at the lower side of the distal end of each lock pin 59 when the card key 42 is inserted into the lock apparatus 41. That is, the depth of the pin accommodation recess 61 is determined so that the semispherical distal end of each lock pin 59 is partially exposed from the pin accommodation recess 61.

The operation of the mechanical operation type door lock system 40 will now be discussed.

When a driver tries to enter the vehicle 1, which is in a parked state (engine stopped, door locked state), if the smart entry system 4 fails to function or if battery drainage occurs in the portable device 3, the doors cannot be unlocked with the smart entry system 4. In such a case, the driver unlocks the vehicle door 1*a* with the mechanical operation type door lock system 40. The driver may carry the card key 42 of the mechanical operation type door lock system 40 in a wallet or the like. The driver inserts the card key 42 into the key hole 43 of the lock apparatus 41. The slider 54 is at the neutral position when the card key 42 is inserted into the lock apparatus 41.

As illustrated in the state of FIG. 4, when the card key 42 is not inserted into the lock apparatus 41, the second pin tumblers 55*b* are in the pin tumbler unlocking state. However, the first pin tumblers 55*a* are in the pin tumbler locking state and thereby restrict movement of the slider 54 relative to the slider case 53. Thus, the slider 54 cannot be moved even when a person inserts his or her fingers into the key hole 43 of the lock apparatus 41 to forcibly move the slider 54. In this manner, unauthorized opening and closing of the lock apparatus 41 is prevented.

Figure 8:
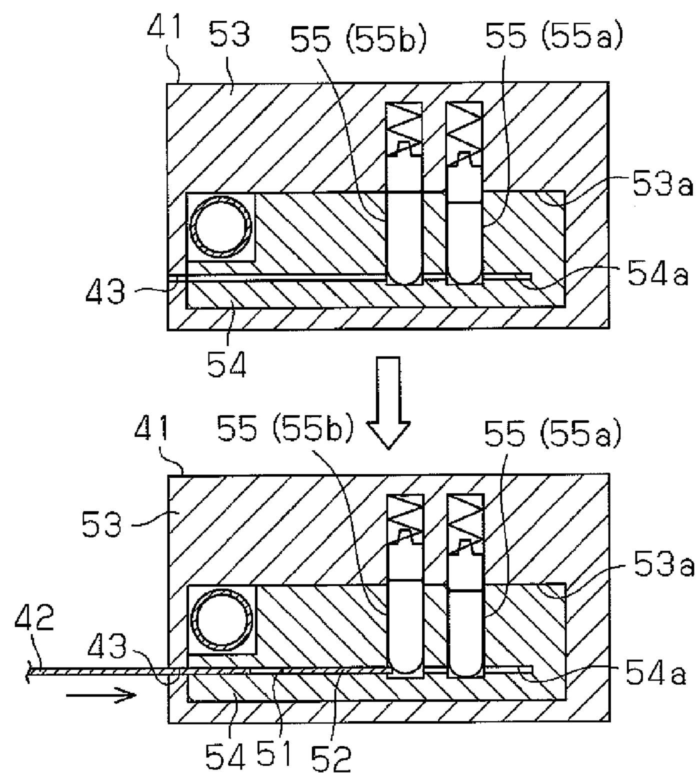
FIG. 8 is a cross-sectional view of the lock apparatus showing states before and during insertion of the card key.

When inserting the card key 42 into the key hole 43, the edge of the card key 42 enters the gap formed at the lower side of the distal ends of the pin tumblers 55 and thereby lifts the pin tumbler 55, as illustrated in the state of FIG. 8. When the card key 42 is completely inserted into the key hole 43, the pin tumblers 55 of the lock apparatus 41 faces the corresponding hole portions 51 and non-hole portions 52 of the card key 42. If the card key 42 is authentic, that is, the proper key, the non-hole portions 52 of the card key 42 would be located at positions corresponding to the first pin tumblers 55*a*, and the hole portions 51 of the card key 42 would be located at positions corresponding to the second pin tumbler 55*b*, as illustrated in the state of FIG. 5(*a*).

If the card key 42 is authentic, each first pin tumbler 55*a* is forced upward by a distance corresponding to the sum of the plate thickness of the card key 42 and the depth of the pin accommodation recess 61 by the corresponding non-hole portion 52 of the card key 42 against the biasing force of the tumbler spring 60. The shear line between the plunger pin 57 and the lock pin 59 of the first pin tumbler 55*a* is aligned with the shear line between the slider case 53 and the slider 54 (pin tumbler unlocking state). Each second pin tumbler 55*b* is fitted into the corresponding hole portion 51 of the card key 42 and thus forced towards the slider 54 by the tumbler spring 60, and the shear line between the plunger pin 57 and the lock pin 59 of the second pin tumbler 55*b* is aligned with the shear line between the slider case 53 and the slider 54 (pin tumbler unlocking state).

In this case, the first pin tumblers 55*a* and the second pin tumblers 55*b* are in the pin tumbler unlocking state. Thus, the lock apparatus 41 is in a slider movable state in which the slider 54 is movable relative to the slider case 53. The slider 54 can be moved from the neutral position with the card key 42 when the lock apparatus 41 is in the slider movable state. Therefore, if the proper key 42 is inserted into the lock apparatus 41 and moved in one direction (direction of arrow R1 of FIG. 6) to move the slider 54 in that direction (as illustrated in the state of FIG. 6), such movement is transmitted to the dead bolt by the transmission mechanism. This retracts the dead bolt from a projected state and unlocks the vehicle door 1*a*.

The plunger pin 57 and the lock pin 59 of each of the pin tumblers 55 must be facing toward each other (overlapped) to enable upward and downward movements of the pin tumblers

55. That is, the card key 42 cannot be removed from the lock apparatus 41 unless the plunger pin 57 and the lock pin 59 of each pin tumbler 55 are facing each other. Therefore, after unlocking the vehicle door 1*a*, the driver returns the card key 42 to the initial position by moving the slider 54 to the neutral position to remove the card key 42 from the lock apparatus 41. The driver then pulls out the card key 42 from the lock apparatus 41 and enters the vehicle while holding the card key 42. The driver performs card key operations in this manner to enter the vehicle.

When locking the vehicle door 1*a* with the mechanical operation type door lock system 40, the authentic card key 42 is inserted into the lock apparatus 41 in which the slider 54 is located at the neutral position. Then, the driver moves the card key 42 in the other direction (direction of arrow R2 of FIG. 7) to move the slider 54 in the other direction (state illustrated in FIG. 7). In this case, the movement of the slider 54 is transmitted to the dead bolt by the transmission mechanism. This projects the dead bolt from the retracted state to lock the vehicle door 1*a*. When removing the card key 42 from the lock apparatus 41 after locking the vehicle door 1*a*, the driver returns the card key 42 to the initial position by moving the slider 54 to the neutral position. Then, the driver pulls out the card key 42 from the lock apparatus 41 in the same manner as when unlocking the vehicle door 1*a* with the lock apparatus 41.

Figure 9:
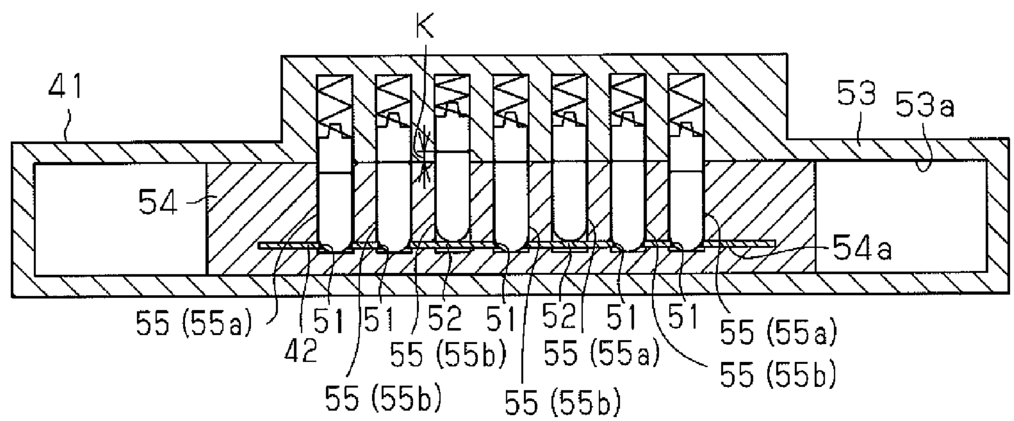
FIG. 9 is a cross-sectional view of the lock apparatus shown together an inauthentic card key.

A case in which an inauthentic key having an improper code is inserted into the lock apparatus 41 will now be discussed. A key having an improper code is a card key in which the array of the hole portions 51 and non-hole portions 52 forms a pattern that is not in correspondence with the key code of the authentic card key 42. If an inauthentic key having an improper code is inserted into the lock apparatus 41, as illustrated in the state of FIG. 9, a hole portion 51 of the card key 42 may be located at a position facing a first pin tumbler 55*a*. Further, a non-hole portion 52 of the card key 42 may be located at a position facing toward a second pin tumbler 55*b*.

When a first pin tumbler 55*a* is facing toward a hole portion 51 of the card key 42, the first pin tumbler 55*a* is fitted into that hole portion 51 and forced towards the slider 54 by the biasing force of the tumbler spring 60. Thus, this first pin tumbler 55*a* shifts to the pin tumbler locking state in which the plunger pin 57 is engaged to both the slider case 53 and the slider 54 over the engagement length K. This restricts movement of the slider 54 relative to the slider case 53. The engagement length K in this case corresponds to the lift amount of the plunger pin 57 if a non-hole portion 52 were to face toward the first pin tumbler 55*a* when inserting the card key 42 into the lock apparatus 41. That is, the engagement length K corresponds to the distance of the sum of the plate thickness of the card key 42 (non-hole portion 52) and the depth of the pin accommodation recess 61.

Further, when a second pin tumbler 55*b* is located at a position facing toward a non-hole portion 52 of the card key 42, the non-hole portion 52 forces the second pin tumblers 55 upward by a distance corresponding to the sum of the plate thickness of the card key 42 and the depth of the pin accommodation recess 61 against the biasing force of the tumbler spring 60. Thus, the second pin tumbler 55*b* is in the pin tumbler locking state in which the lock pin 59 engages both the slider case 53 and the slider 54 over the length forced upward by the non-hole portion 52 of the card key 42 as the engagement length K. This restricts movement of the slider 54 relative to the slider case 53.

Therefore, when one or more of the pin tumblers 55 are in the pin tumbler locking state, the slider 54 cannot move relative to the slider case 53. Such a state is referred to as a slider immovable state. The slider 54 cannot be moved from the neutral position using the card key 42 that is inserted into the lock apparatus 41 when the lock apparatus 41 is in the slider immovable state. Thus, the locking and unlocking of the vehicle door 1*a* cannot be performed if the card key 42 that is inserted into the lock apparatus 41 has an improper code.

Figure 10:
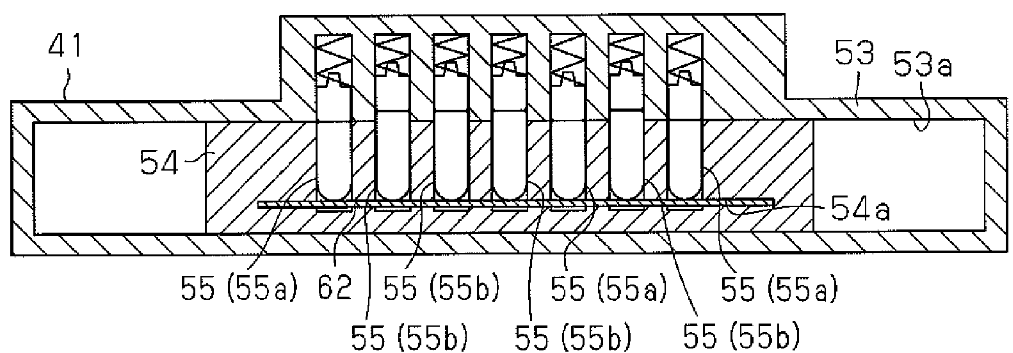
FIG. 10 is a cross-sectional view of the lock apparatus shown together with a plate having no holes.

An example of an unauthorized key operation in which a plain plate 62 is inserted into the lock apparatus 41 to forcibly move the slider 54 and attempt unauthorized opening or closing of the lock apparatus 41 will now be discussed with reference to FIG. 10. If the plain plate 62 is inserted into the lock apparatus 41, the plain plate 62 forces both the first pin tumblers 55*a* and the second pin tumblers 55*b* upward against the biasing force of the tumbler springs 60. The first pin tumblers 55*a* shifts to the pin tumbler unlocking state with the shear line between the plunger pin 57 and the lock pin 59 aligned with the shear line between the slider case 53 and the slider 54. However, the second pin tumblers 55*b* are in the pin tumbler locking state in which the lock pins 59 are engaged with the slider case 53 and the slider 54.

In this manner, when the plain plate 62 is inserted into the lock apparatus 41 as an inauthentic key to perform an unauthorized key operation, the second pin tumblers 55*b* function to fix the slider 54 to the slider case 53. Thus, due to the second pin tumblers 55*b*, the lock apparatus 41 is in a slider immovable state. Therefore, even if a third person attempts to perform an unauthorized key operation by inserting the plain plate 62 into the lock apparatus 41 to forcibly move the slider 54, movement of the slider 54 is disabled. As a result, the lock apparatus 41 does not open when performing an unauthorized key operation with this type of plain plate 62 in the same manner as when using an inauthentic key having an improper code.

The IC card key 42, which has the key code pattern 50 that defines a key code for a mechanical key, functions as an emergency key for the key operation-free system 2. The key code pattern 50 is arranged inward from the antenna 47 of the wireless communication mechanism 45 that is incorporated in the IC card key 42. The antenna 47 is arranged between the key code pattern 50 and the rim of the IC card key 42. The antenna 47 is formed from a mechanically strong material such as metal and thereby increases the mechanical strength of the IC card key 42. Thus, the mechanical strength at the part between the key code pattern 50 (especially, the hole portions 51) and the rim of the IC card key 42 is increased, and the rim of the IC card key 42 resists breakage.

The antenna 47 may be formed by winding a metal wire, such as a fine copper wire a number of times to form a coil. Such a coil would function as a frame for the IC card key 42. If an impact were to be applied to the IC card key 42, this may crack the IC card key 42. However, the antenna 47 (coil) would hold together the cracked IC card key 42 and prevent the IC card key 42 from breaking apart. In comparison with a plate that is formed from the same material as the IC card key 42 and does not include the hole portions 51, the IC card key 42 that includes the hole portions 51 has a lower mechanical strength and is more opt to breaking near the hole portions 51. To solve this problem, the antenna 47 arranged near the hole portions 51 of the IC card key 42 functions as a breakage prevention member and effectively prevents breakage of the IC card key 42.

The region of the IC card key 42 inward from the antenna 47 includes an unused area, which is not used by the wireless communication mechanism 45. The mechanical key code, or key code pattern 50, is formed in the unused area. Therefore, when forming the key code in an IC card and using the IC card as a vehicle key, the IC card does not need additional space for a key code. Therefore, the IC card may be used as a card key without enlarging the IC card.

When forming the key code pattern 50 in an IC card, the formation of hole portions in a region inward from the antenna 47 would prevent the antenna 47 from being affected by the key code pattern 50. Further, the antenna 47 can be laid out along the rim of the IC card key. Further, even if the key code pattern 50 is formed on an IC card, the antenna 47 may have the required dimensions. Therefore, the formation of the key code pattern 50 in an IC card would not reduce the size of the antenna 47, and sufficient antenna capacity would be ensured for the antenna 47.

The first embodiment has the advantages described below.

(1) When forming the key code pattern 50 as a key code on an IC card and using such an IC card as an IC card key, the key code pattern 50 is arranged inward from the antenna 47. The key code pattern 50 is surrounded with the antenna 47, which has a high mechanical strength. This increases the mechanical strength between the key code pattern 50 and the rim of the IC card key 42. Thus, even though the key code pattern 50 is formed, the rim of the IC card key 42 resists breakage. Further, the mechanical strength near the key code pattern 50 is sufficiently ensured without any special reinforcement structure. Since there is no special reinforcement structure, the IC card key 42 has a simple and light structure.

(2) The IC card key 42 including the key code pattern 50 functions as an emergency key for the key operation-free system 2. Therefore, the portable device 3 does not have to accommodate a mechanical emergency key and the portable device 3 may be miniaturized. Further, when forming the key code pattern 50 on a conventional IC card to produce the IC card key 42, the key code pattern 50 is formed in a vacant area that does not include components of the wireless communication mechanism 45. In other words, the hole portions 51 of the key code pattern 50 are remote from electronic components of the wireless communication mechanism of the IC card Key 42 in the surface direction of the key body. Thus, electronic components of the conventional IC card may continuously be used without being moved, and the IC card does not have to be enlarged.

(3) The key code pattern 50 of the IC card key 42 is arranged inward from the antenna 47 of the IC card key 42. The antenna 47 may be laid out along the rim of the IC card key 42. Thus, the antenna 47 may have a sufficient size. This ensures that the antenna 47 has sufficient antenna capacity even when forming the key code pattern 50 on an IC card and using the IC card as a key.

(4) The mechanical operation type door lock system 40 includes the lock apparatus 41, which includes the pin tumblers 55, each formed by the two types of pins 57 and 59. Such type of a lock apparatus is simple.

(5) The card key 42 has the shape of a thin card and therefore may be accommodated in a small space, such as in a wallet. Thus, the card key 42 can be easily carried.

(6) The key code of the card key 42 is formed by the key code pattern 50 that includes a plurality of recessed portions and a plurality of non-recessed portions on a card (plate). When forming a key code on the card key 42, the hole portions 51 may be formed by recessed portions having closed bottoms. However, in such a case, the thickness of the card key 42 would have to be increased for the closed recessed portions to have sufficient depths. By using the hole portions 51, there would be no need for closed bottoms. Thus, the thickness of the card key 42 can be decreased. Accordingly, by using a pattern including the hole portions 51 as the key code of the card key 42, the thickness of the card key 42 can be decreased.

A second embodiment of the present invention will now be discussed with reference to FIGS. 11 and 12. The second embodiment differs from the first embodiment only in the hole portions of the key code pattern 50 and the corresponding components. Thus, like or same reference numerals are given to those components that are the same as the corresponding components of the first embodiment, and only different components will be discussed.

Figure 11:
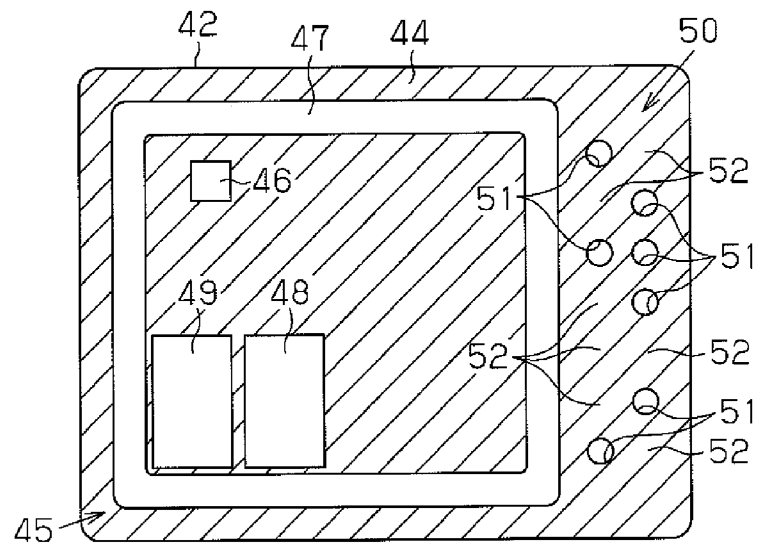
FIG. 11(*a*) is a cross-sectional front view of an IC card key in a second embodiment.
Figure 11:
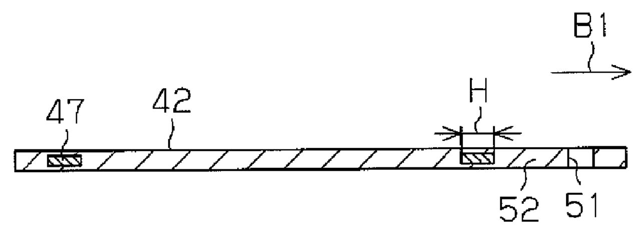
Figure 12:
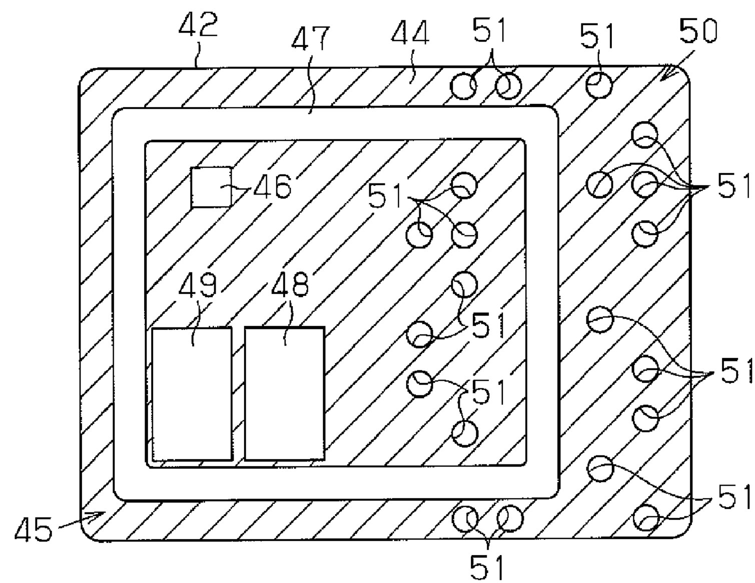
FIG. 12 is a cross-sectional view of a modification of the IC card key shown in FIG. 11(*a*)

Referring to FIG. 11 (*a*), the key body 44 of the IC card key 42 includes a key code pattern 50, which functions as a key code for a mechanical emergency key in a key operation-free system 2. The key code pattern 50 is arranged outside the antenna 47, which is looped. The key code pattern 50 is located at a front part of the key body 44 with respect to the direction in which the IC card key 42 is inserted into the lock apparatus 41. The pin tumblers 55 are arranged in the lock apparatus 41 in correspondence with the key code pattern 50, which is located at the front part of the IC card key 42 with respect to the key insertion direction (direction of arrow B1 in FIG. 11 (*b*)).

When inserting the IC card key 42 into the lock apparatus 41, when the pin tumblers 55 are lifted onto the front part of the IC card key 42, key verification is immediately performed at the front part by the pin tumblers 55 and the key code pattern 50 of the IC card key 42. If the key code pattern 50 of the IC code key 42 is the authentic pattern and key verification is thus established, mechanical locking operations with the IC card key 42 are enabled. If the key code pattern 50 of the IC card key 42 is an inauthentic pattern and key verification is thus not established, mechanical locking operation with the IC card key 42 are disabled.

When forming the key code pattern 50 on an IC card as a key code for a mechanical key to obtain the IC card key 42, the key code pattern 50 is formed outward from the antenna 47 at the front part of the IC card key 42 with respect to the direction in which the IC card key 42 is inserted into the lock apparatus 41. When inserting the IC card key 42 into the lock apparatus 41, the pin tumblers 55 slide along the surface of the IC card key 42 before being fit into the corresponding hole portions 51. By arranging the key code pattern 50 outward from the antenna 47, as soon as the pin tumblers 55 are lifted onto the IC card key 42, the pin tumblers 55 are fitted into the corresponding hole portions 51.

When the IC card key 42 is removed from the lock apparatus 41 and the pin tumblers 55 are separated from the hole portions 51, the pin tumblers 55 do not move slide across an antenna coating surface H (refer to FIG. 11), under which the antenna 47 is located, in the surface of the IC card key 42. This prevents the antenna 47 from being exposed or torn by friction produced by the pin tumblers 55.

When forming the key code pattern 50 on an IC card, the location of the key code pattern 50 is not limited to the region outward from the antenna 47. For example, the region outward from the antenna 47 and the region inward from the antenna 47 may both be used to lay out the key code pattern 50 as shown in FIG. 12. In this case, the key code pattern 50 occupies more space and includes more hole portions. Nevertheless, the IC card key 42 does not have to be enlarged. Further, the hole portions of the key code pattern 50 are located in both of the regions outward from and inward from the antenna 47. However, the mechanical strength of the IC card key 42 may be improved around the hole portions (key code pattern) located inward from the antenna 47. Thus, in comparison with when the hole portions of the key code pattern 50 are all located outward from the antenna 47, the mechanical strength of the IC card key 42 can be increased.

In addition to advantages (1) to (6), the second embodiment has the advantages described below.

(7) When forming the key code pattern 50 in an IC card as a key code for a mechanical key to obtain the IC card key 42, and the key code pattern 50 is arranged outward from the antenna, the antenna 47 is prevented from being torn by the pin tumblers 55.

(8) When forming the key code pattern 50 in an IC card as a key code for a mechanical key to obtain the IC card key 42, if the regions outward from and inward from the antenna 47 are both used by the key code pattern 50, a large number of the hole portions 51 may be formed without enlarging the IC card key 42.

A third embodiment of the present invention will now be discussed with reference to FIGS. 13 to 16. The third embodiment differs from the above-described embodiments only in the hole portions of the key code pattern 50 and the corresponding components. Thus, like or same reference numerals are given to those components that are the same as the corresponding components of the above-described embodiments, and only different components will be discussed.

Figure 13:
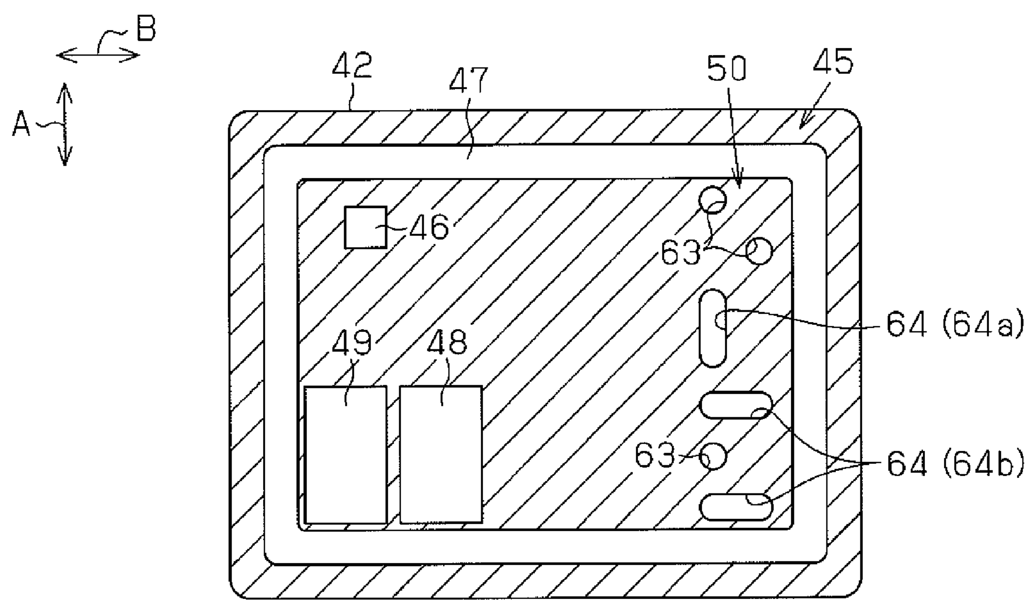
FIG. 13 is a cross-sectional view of an IC card key in a third embodiment.

Referring to FIG. 13, the key code pattern 50 is formed by the combination of round hole portions 63 (shaped identically to the hole portions 51 of the first and second embodiments) and oblong hole portions 64. The oblong hole portions 64 includes first oblong hole portions 64*a*, which extend in a lateral direction (the direction of arrow A in FIG. 13) of the card key 42, and second oblong hole portions 64*b*, which extends in the longitudinal direction (the direction of arrow B in FIG. 13) of the card key 42. That is, the key code pattern 50 includes four elements having different shapes, the non-hole portions 52, the round hole portions 63, the first oblong hole portions 64*a*, and the second oblong hole portions 64*b*. The round hole portions 63 and the oblong hole portions 64 serve as recessed portions.

Figure 14:
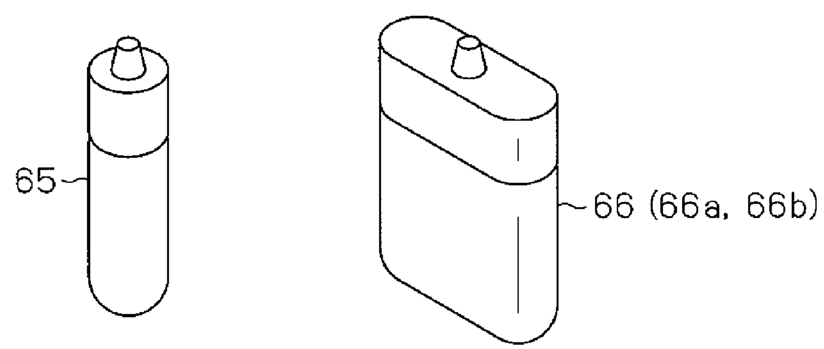
FIG. 14 is a perspective view showing pin tumblers corresponding to holes of the IC card key shown in FIG. 13.

Referring to FIG. 14, the lock apparatus 41 includes round pin tumblers 65, which have round cross-sections, and oblong pin tumblers 66, which have oblong cross-sections. The round pin tumblers 65, which have the same shape as the pin tumbler 55 of the first and second embodiments, are arranged at positions corresponding to the round hole portions 63 of the authentic card key 42. The oblong pin tumblers 66 includes first oblong pin tumblers 66*a*, which extend in the lateral direction to be fitted to the first oblong hole portions 64*a*, and second oblong pin tumblers 66*b*, which extend in the longitudinal direction to be fitted to the second oblong hole portions 64*b*. The first oblong pin tumblers 66*a* can be fitted into the first oblong hole portions 64*a* of the authentic card key 42 and are located at positions corresponding to the first oblong hole portions 64*a* when the authentic card key 42 is inserted into the lock apparatus 41. The second oblong pin tumblers 66*b* can be fitted into the second oblong hole portions 64*b* of the authentic card key 42 and are located at positions corresponding to the second oblong hole portions 64*b* when the authentic card key 42 is inserted into the lock apparatus 41. Any of the round pin tumblers 65 and the oblong pin tumblers 66 may be located at positions corresponding to the non-hole portions 52 when the authentic card key 42 is inserted into the lock apparatus 41.

When the card key 42 is inserted into the lock apparatus 41, key verification is performed with the key code pattern 50 of the card key 42 and the pin tumblers 65, 66*a*, and 66*b*. During the verification, if the pin tumblers 65, 66*a*, and 66*b* are each arrange at a position facing toward the hole portions 63, 64*a*, and 64*b*, which have the corresponding shapes, the pin tumblers 65, 66*a*, and 66*b* are all in the pin tumbler unlocking state and enable movement of the slider 54. Thus, locking and unlocking operations can be performed with the lock apparatus 41. When the card key 42 is inserted into the lock apparatus 41, if any one of the pin tumblers 65, 66*a*, and 66*b* is arranged at a position facing a hole portion that does not have a corresponding shape, that pin would be in the pin tumbler locking state and restrict movement of the slider 54. Thus, locking and unlocking operations cannot be performed with the lock apparatus 41.

The key code of the card key 42 is formed by the combination of round hole portions 63 and oblong hole portions 64. It is thus difficult to duplicate the card key 42.

When the slider 54 is moved in the lateral direction of the card key 42 to perform a locking or unlocking operation with the lock apparatus 41, if an inauthentic card key is inserted into the lock apparatus 41 and a second oblong pin tumbler 66*b* is in a tumbler locking state, the corresponding second oblong hole portion 64*b* would receive the oblong pin tumbler 66*b* over a wide area. Thus, the pin tumbler 66*b* significantly increases the lock strength. In this manner, by including the second oblong hole portions 64*b* in the key code pattern 50 of the card key 42, the lock strength produced by the pin tumblers is further increased.

Figure 15:
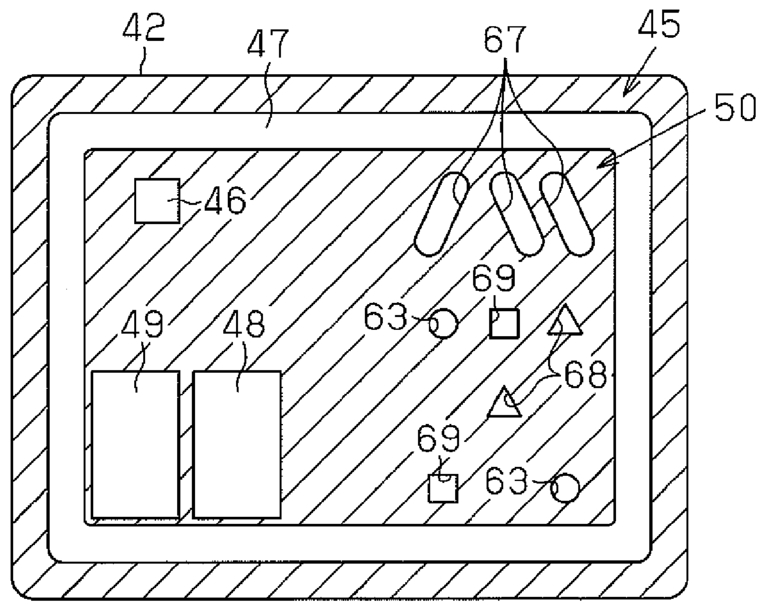
FIG. 15 is a cross-sectional view of a modification of the IC card key shown in FIG. 13.
Figure 16:
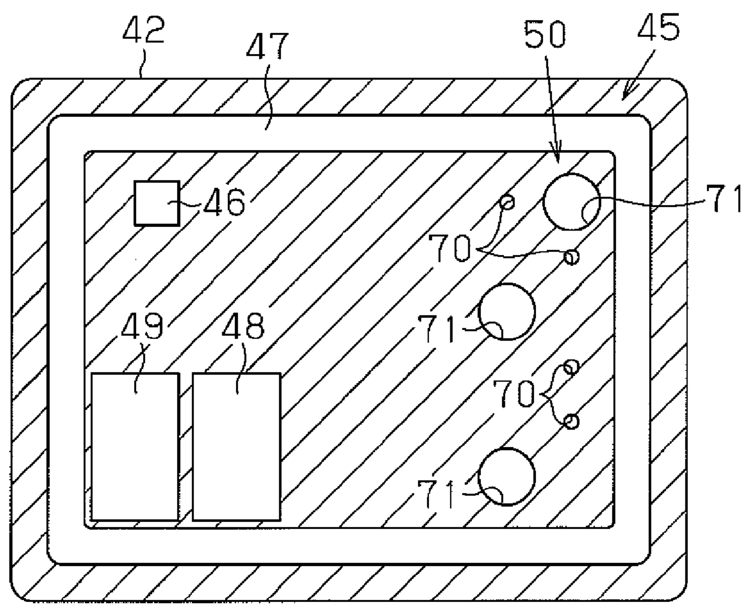
FIG. 16 is a cross-sectional view of a further modification of the IC card key shown in FIG. 13.

When the key code pattern 50 includes hole portions having different shapes, the shapes are not limited to those of the round hole portions 63 and the oblong hole portions 64. For example, as shown in FIG. 15, the key code pattern 50 may be formed by a combination of diagonal oblong hole portions 67, triangular hole portions 68, and square hole portions 69. In this case, the shapes of the hole portions are further increased. This makes it further difficult to duplicate the card key 42. Further, as shown in FIG. 16, the key code pattern 50 may be formed by a combination of small round hole portions 70 and large round hole portions 71. This also makes it difficult to duplicate the card key 42. The diagonal oblong hole portions 67, the triangular hole portions 68, the square hole portions 69, the small round hole portions 70, and the large round hole portions 71 serve as recessed portions.

In addition to advantages (1) to (6) of the first embodiment, the third embodiment has the advantages described below.

(9) The key code pattern 50, which functions as the key code of the card key 42, includes hole portions having difference shapes. Thus, to duplicate the card key 42, holes portions of different shapes must be formed on a card key. This makes it difficult to duplicate the card key.

(10) When using the oblong hole portions 64 in the key code pattern 50, when a wide pin tumbler that extends in a direction perpendicular to the sliding direction of the slider 54 is in a pin tumbler locking state, the pin tumbler significantly increases the lock strength. Thus, the slider 54 cannot be forcibly moved, and the pin tumbler locks the slider 54 to the slider case 53 with the increased lock strength. This prevents unauthorized locking and unlocking operations of the lock apparatus 41.

A fourth embodiment of the present invention will now be discussed with reference to FIGS. 17 and 18. The fourth embodiment differs from the above-described embodiments only in the hole portions of the key code pattern 50 and the corresponding components. Thus, like or same reference numerals are given to those components that are the same as the corresponding components of the above-described embodiments, and only different components will be discussed.

Figure 17:
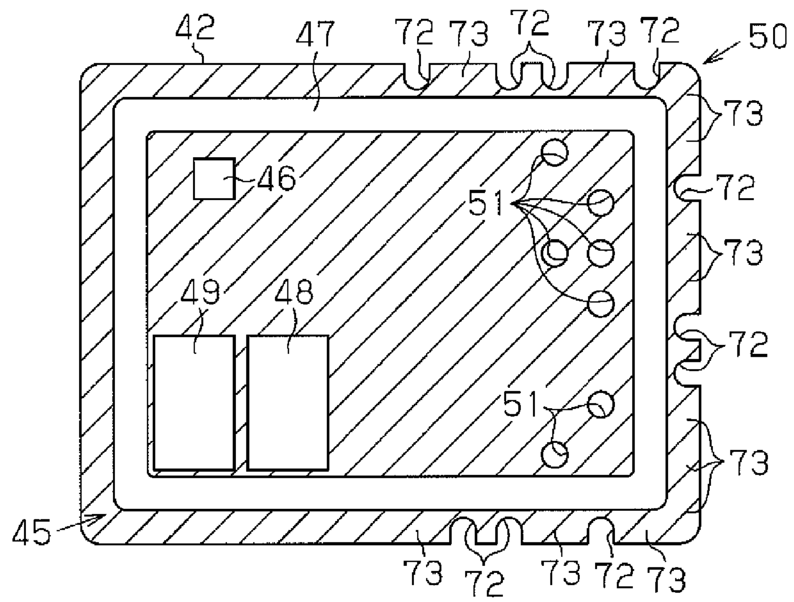
FIG. 17 is a cross-sectional view of an IC card key in a fourth embodiment.

Referring to FIG. 17, the card key 42 includes cutout portions 72 and non-cutout portions 73, which form part of the key code pattern 50 along the rim of the front part of the key body 44. The cutout portions 72 are formed by cutting out the rim of the key body 44 so as to be arranged with a regularity.

For example, the cutout portions 72 may be arranged continuously or in certain intervals. In this manner, the key code pattern 50 at the key card rim is formed by the cutout portions 72 and the non-cutout portions 73, which are not cut out. The key code pattern 50 of the IC card key 42 is formed by the combination of the hole portions 51, which are located inward from the antenna 47, and the cutout portions 72, which are located on the rim of the card key 42.

Figure 18:
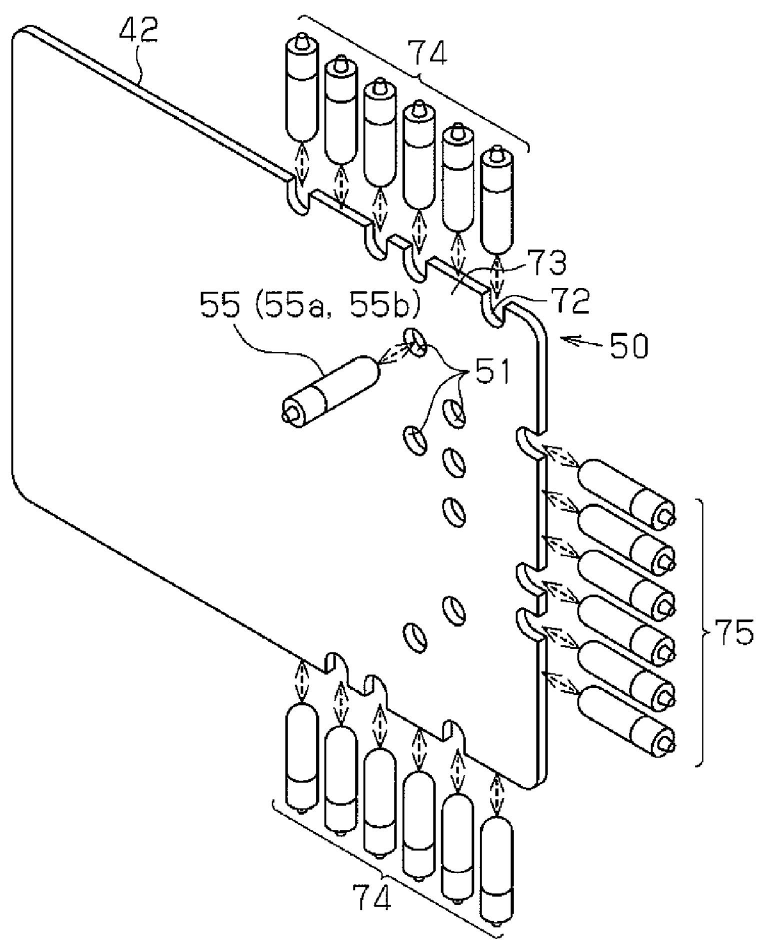
FIG. 18 is a perspective view showing the IC card key of FIG. 17 and corresponding pin tumblers.

Referring to FIG. 18, the lock apparatus 41 includes a plurality of pin tumblers 74 and 75 corresponding to the cutout portions 72. The pin tumblers 74 and 75 basically have the same structure as the pin tumblers 55, which correspond to the hole portions 51, and are arranged in direction perpendicular to the axis of the pin tumblers 55. More specifically, the pin tumblers 74 extend in the lateral direction of the card key 42, and the pin tumblers 75 extend in the longitudinal direction of the card key 42. Since the pin tumblers 74 and 75 basically have the same structure as the pin tumblers 55 although they are arranged in different direction, the pin tumblers 74 and 75 will not be described in detail.

When inserting the IC card key 42 into the lock apparatus 41, the hole portions 51 and non-hole portions 52 of the card key 42 are verified with the pin tumblers 55. Further, the pin tumblers 74 and 75, which extend perpendicular to the pin tumblers 55, are verified with the cutout portions 72 and non-cutout portions 73 of the card key 42. When the hole portions 51, non-hole portions 52, cutout portions 72, and non-cutout portions 73 are verified, the pin tumblers 55, 74, and 75 are all in a pin tumbler locking state and enable movement of the slider 54. In this state, locking and unlocking operations can be performed with the lock apparatus 41. When the hole portions 51, non-hole portions 52, cutout portions 72, and non-cutout portions 73 cannot be verified, at least one of the pin tumblers 55, 74, and 75 is in a pin tumbler locking state. Thus, locking and unlocking operations cannot be performed with the lock apparatus 41.

In this manner, the region of the IC card key 42 outward from the antenna 47 is used to lay out the key code. However, the key code located outward from the antenna 47 is formed by the cutout portions 72 (recessed portions), which are cut out from the card rim. This reduces the space occupied by the key code in comparison with when using hole portions. The formation of a large number of hole portions in the region outward from the antenna 47 would enlarge the card key 42. However, by forming the cutout portions 72 in the card rim, the required number of recessed portions for the key code pattern 50 may be ensured without enlarging the card key 42.

In addition to advantages (1) to (6) of the first embodiment, the fourth embodiment has the advantage described below.

(11) The key code arranged in the region of the IC card key 42 outward from the antenna 47 includes the cutout portions 72 formed by cutting out the rim of the card key 42. The use of the cutout portions 72 reduces the space occupied by the key code in comparison to when using hole portions. Thus, the recessed portions of the key code pattern 50 may be increased without enlarging the card key 42.

It should be apparent to those skilled in the art that the present invention may be embodied in many other specific forms without departing from the spirit or scope of the invention. Particularly, it should be understood that the present invention may be embodied in the following forms.

In the first to fourth embodiments, the antenna 47 does not have to have a looped shape. For example, a bar-shaped antenna may be used instead.

In the first to fourth embodiments, the shape of the hole portions in the key pattern do not have to be round (small or large), oblong, square, or triangular and may have any shape.

In the first to fourth embodiments, the wireless communication performed by the wireless communication mechanism 45 of the IC card key 42 does not have to be in compliance with RFID communication and may be any type of wireless communication.

In the first to fourth embodiments, the functions implemented by the card key 42 (wireless communication mechanism 45) is not limited to an electronic payment function such as an OSAIFU-KEITAI®. For example, the card key 42 may implement an electronic key function that transmits an ID code of the vehicle from the wireless communication mechanism 45, and the card key 42 may be used as an electronic key (master key) of the vehicle 1. In this case, the card key 42, which is thin and has superior portability, is used as the electronic key. Thus, in comparison with the portable device, the card key 42 significantly increases the key portability. Further, the doors may be unlocked by performing mechanical key verification with the key code pattern 50 of the card key 42 when entering the vehicle 1, and key verification may be performed with the wireless communication mechanism 45 when starting the engine. In this case, the one-push engine start system 24 may be used to start the engine.

Figure 19:
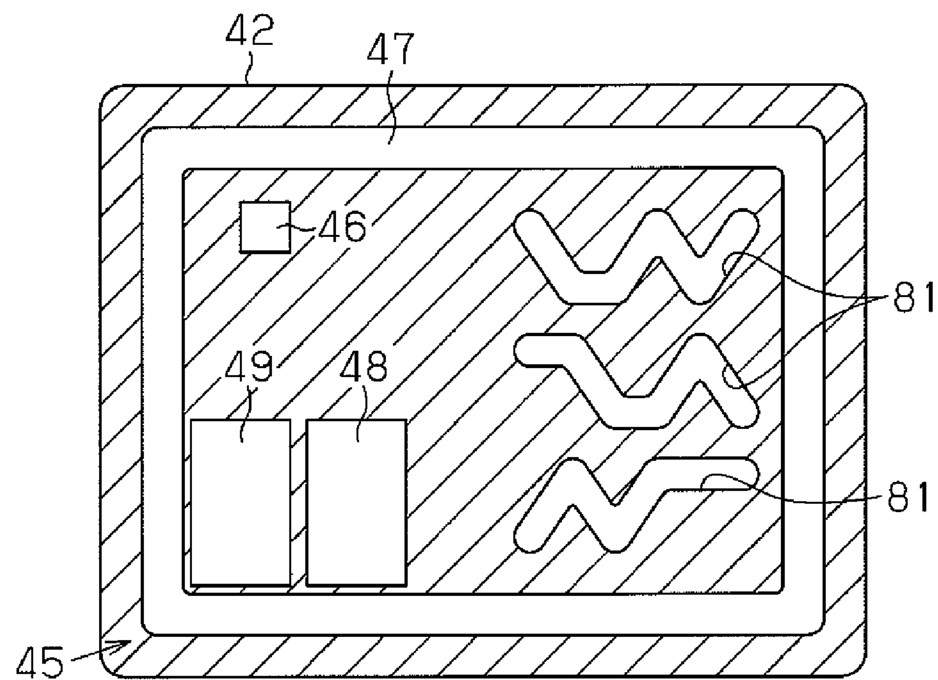
FIG. 19 is a further example of an IC card key.

In the first to fourth embodiments, as shown in FIG. 19, the key code pattern 50 may be formed by continuous hole portions 81, each corresponding to one or more pin tumblers. The shape of the continuous hole portions 81 is not limited in any manner. The continuous hole portions 81 may be formed by grooves.

Figure 20:
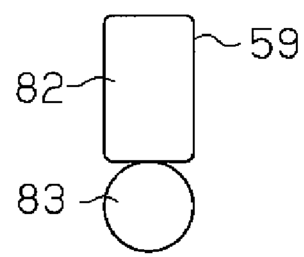
FIG. 20 is a further example of a pin tumbler.

In the first to fourth embodiments, the lock pin 59 of each of the pin tumblers does not have to be a single component and may be formed from a plurality of components as illustrated in FIG. 20. In this case, the lock pin 59 includes a cylindrical body portion 82 and a distal end pin 83, which is a component separate from the body portion 82 and which contacts the card key. The distal end pin 83, which functions to enable smooth insertion of the card key 42 into the lock apparatus 41, is round and may be spherical or cylindrical. If a pin tumbler 55 includes the distal end pin 83, the card key 42 may be smoothly inserted to the lock apparatus 41 so as to reduce resistance during card insertion. The distal end pin 83 is one example of an auxiliary member.

In the first to fourth embodiments, the mechanical key for the mechanical operation type door lock system 40 is not limited to a card key 42, which is extremely thin and plate-shaped like a credit card. The mechanical key may be thicker but smaller than a credit card, in the same manner as a memory card. In this case, the card key 42 may be accommodated in a memory card slot of a cell phone or the like. The mechanical key for the mechanical operation type door lock system 40 is not limited to a key body of a card shape and may have a key-plate shape having a slight thickness.

In the first to fourth embodiments, the hole portions 51 extend through the card key 42. However, recesses having closed surfaces that do not extend through the card key 42 may be used instead.

In the first to fourth embodiments, the lock apparatus 41 is not limited to a structure for manually moving the slider 54 with the card key 42. An electrical structure for detecting the pin tumbler unlocking state of all the pin tumblers with a sensor and moving the slider 54 with power from a motor or the like may be adopted.

In the first to fourth embodiments, the lock apparatus 41 is not limited to a slide type in which a movable member (slider 54) linearly slides when operating the lock apparatus 41 and may be a rotatable type in which the movable member is rotated by inserting a key into the lock apparatus 41.

In the first to fourth embodiments, the biasing member for biasing each pin tumbler is not limited to a spring and may be a rubber material.

In the first to third embodiments, the pin tumblers do not have to be movable in the same direction. For example, in the same manner as in the fourth embodiments, cutout portions 72, which receive the pin tumblers 74, may also be formed as part of the key code in the rim of the card key 42.

In the first to fourth embodiments, the activation of the relays 32 to 34 is not limited to electrical management by the power supply ECU 28 and may be a mechanical type in which the relays are switched between activated and deactivated states by the physical operation of the key.

In the first to fourth embodiments, the lock apparatus 41 is not limited to a pin tumbler-type including two pin member, and may be a disk tumbler-type in which the tumbler member is plate-shaped.

In the first to fourth embodiments, the IC card key 42 may be an IC card key in which a transponder is embedded. In this case, the immobilizer verification becomes possible with the card key 42.

In the first to fourth embodiments, the electronic key system is not limited to a key operation-free system 2 in which the locking and unlocking of the door and the starting and stopping of the engine are automatically permitted or executed as long as the driver is carrying the proper portable device 3. A wireless key system in which various operation buttons are formed in the electronic key may be used in which an operation request command and key code are transmitted to the vehicle 1 through wireless communication when such a button is pushed.

In the first to fourth embodiments, the engine starting and stopping system of the vehicle 1 is not limited to a one-push engine start system 24 and may be a mechanical operation engine starting and stopping system in which the mechanical key 42 is inserted into the engine starting and stopping key cylinder and turned to start or stop the engine.

In the first to fourth embodiments, the mechanical operation key system using the card key 42 is not necessarily limited to emergency use with the smart entry system 4 and may be used during an emergency of the one-push engine start system 24. The mechanical operation key system using the card key 42 of the preferred embodiment merely needs to be adopted in at least one of the smart entry system 4 or the one-push engine start system 24.

In the first to fourth embodiments, the mechanical operation type door lock system 40 is not limited to vehicles, and may be used in various components for opening and closing components such as the door of a house and the like.

The present examples and embodiments are to be considered as illustrative and not restrictive, and the invention is not to be limited to the details given herein, but may be modified within the scope and equivalence of the appended claims.

What is claimed is:

1. A mechanical key code verification system comprising:
a mechanical key; and
a lock apparatus into which the mechanical key is insertable;
the mechanical key including:
a key body having at least one plane;
a key code pattern formed on the at least one plane of the key body and including a plurality of recessed portions and a plurality of non-recessed portions; and
a wireless communication mechanism incorporated in the key body which performs wireless communication with a communication device, with the wireless communication device including an antenna arranged on the key body;
wherein the lock apparatus mechanically verifies the key code pattern of the mechanical key when the mechanical key is inserted therein; and
wherein the recessed portions of the key code pattern of the mechanical key are located inward from the antenna on the key body.

2. The mechanical key code verification system according to claim 1, wherein:
the lock apparatus includes:
a support member;
a movable member which is movable relative to the support member;
a plurality of pin tumblers each corresponding to one of the recessed portions and non-recessed portions; and
a plurality of biasing members each provided for one of the pin tumblers to bias the pin tumbler;
each of the pin tumblers includes:
a first locking pin which is movably held by the movable member; and
a second locking pin which is movably held by the support member; and
when the mechanical key is inserted into a key hole of the lock apparatus, alignment of a shear line between the first locking pin and second locking pin of each of the pin tumblers with a shear line of the movable member and support member enables movement of the movable member when the mechanical key is operated.

3. The mechanical key code verification system according to claim 1, wherein the recessed portions of the key code have various types of shapes.

4. The mechanical key code verification system according to claim 1, wherein the mechanical key is a card key.

5. The mechanical key code verification system according to claim 1, wherein:
the mechanical key code verification system is a mechanical key operation key system installed in a vehicle and including an electronic key system which verifies an electronic key code transmitted through wireless communication from an electronic key; and
the mechanical key functions as an emergency key for the electronic key system.

6. The mechanical key code verification system according to claim 5, wherein the mechanical key is capable of transmitting a key code through wireless communication for the electronic key system from the wireless communication mechanism, and the mechanical key is usable as the electronic key of the electronic key system.

7. The mechanical key code verification system according to claim 1, wherein the mechanical key implements an electronic key function using the antenna and a mechanical emergency key function using the key code pattern.

8. The mechanical key code verification system according to claim 1, wherein the recessed portions in the key code pattern are all located inward from the antenna on the key body.

9. The mechanical key code verification system according to claim 1, wherein the key code pattern includes a first plurality of recessed portions located inward from the antenna on the key body and a second plurality of recessed portions located outward from the antenna on the key body.

10. The mechanical key code verification system according to claim 1, wherein the key code pattern includes a first plurality of recessed portions located inward from the antenna on the key body and a second plurality of recessed portions formed by cutout portions in a rim of the key body.

11. The mechanical key code verification system according to claim 5, wherein the recessed portions of the key code pattern are remote from electronic components of the wireless communication mechanism of the mechanical key in the surface direction of the key body.

12. The mechanical key code verification system according to claim 1, wherein the antenna is a looped antenna.

13. The mechanical key code verification system according to claim 1, wherein the plurality of recessed portions are holes extending through the key body.

* * * * *